United States Patent

Sawada et al.

[11] Patent Number: 6,007,452
[45] Date of Patent: Dec. 28, 1999

[54] LINE PRESSURE CONTROL SYSTEM FOR CONTINUOUSLY VARIABLE TRANSMISSION ACCOUNTING FOR INPUT LOAD CHANGES CAUSED BY INERTIA DURING SHIFTING

[75] Inventors: Makoto Sawada; Hirofumi Okahara, both of Kanagawa, Japan

[73] Assignee: Nissan Motor Co., Ltd., Yokohama, Japan

[21] Appl. No.: 09/113,567

[22] Filed: Jul. 10, 1998

[30] Foreign Application Priority Data

Jul. 11, 1997 [JP] Japan .................................. 9-186558

[51] Int. Cl.$^6$ ....................................................... F16H 9/00
[52] U.S. Cl. ............................ 477/45; 477/158; 477/159; 477/161; 474/12; 474/17; 474/18
[58] Field of Search ................................. 477/45, 48, 49, 477/158, 159, 160, 161; 474/28, 12, 17, 18

[56] References Cited

U.S. PATENT DOCUMENTS

| | | | |
|---|---|---|---|
| 4,819,514 | 4/1989 | Yamamuro et al. | 477/45 X |
| 5,157,992 | 10/1992 | Hayashi et al. | 477/45 X |
| 5,382,205 | 1/1995 | Yogai et al. | 477/43 |
| 5,569,114 | 10/1996 | Matsuda et al. | 477/45 |
| 5,697,866 | 12/1997 | Okahara | 477/169 |

FOREIGN PATENT DOCUMENTS

| | | |
|---|---|---|
| 3-38517 | 1/1991 | Japan . |
| 7-239002 | 9/1995 | Japan . |
| 07259940 | 10/1995 | Japan . |
| 8-200461 | 8/1996 | Japan . |
| 9-112674 | 5/1997 | Japan . |

*Primary Examiner*—Charles A Marmor
*Assistant Examiner*—Ankur Parekh
*Attorney, Agent, or Firm*—Foley & Lardner

[57] ABSTRACT

A control system for a CVT comprises a controller arranged to compute an engine revolution condition on the basis of an engine revolution speed indicative signal, to compute actual and estimated engine outputs on the basis of the engine revolution condition, to compute a rotational change condition of the drive system, to compute an actual input load change amount caused by the inertia by multiplying the actual rotational change condition detection value by a predetermined inertial constant, to compute an estimated input load change amount by multiplying the estimated rotational change condition detection value by a predetermined inertia coefficient, to select larger one of the actual input load change amount and the estimated input load change amount as the input load change amount for outputting a command signal, and to output the command signal to a line pressure duty valve on the basis of the engine output and the selected input load change amount so as to further accurately control a line pressure.

7 Claims, 7 Drawing Sheets and a forward/reverse change over mechanism 15. An output
LINE PRESSURE CONTROL SYSTEM FOR CONTINUOUSLY VARIABLE TRANSMISSION ACCOUNTING FOR INPUT LOAD CHANGES CAUSED BY INERTIA DURING SHIFTING The contents of Application No. TOKUGANHEI 9-186558, with a filing date Jul. 11, 1997 in Japan, are hereby incorporated by reference.

BACKGROUND OF THE INVENTION

The present invention relates to improvements in a control system for a continuously variable transmission (CVT) for a vehicle, and more particularly to a control system for a belt type CVT.

A Japanese Patent Provisional Publication No. 8-200461 discloses a typical belt type CVT which comprises driver and follower pulleys and a belt for intercoupling the pulleys. Each of the driver and follower pulleys has a variable groove at which the belt is held. A belt holding force for holding the belt by each pulley is varied basically to correspond with a line pressure which is produced from a fluid pressurized by a pump through an electrically controlled pressure control valve. The line pressure is increased according to the increase of an input load applied from an engine to the CVT. The input load is basically calculated from a throttle opening and an engine revolution speed of an engine.

SUMMARY OF THE INVENTION

However, a line pressure control system of such a conventional CVT has not been arranged to take account of an inertia caused in a drive system including the engine. That is, if the rotational condition of the drive system is changed, an inertia moment of the drive system is also changed, and therefore the change amount of the inertia moment will be applied to a CVT mechanism. When an upshift is executed, more particularly, when a transmission ratio of the CVT is steppingly decreased during the upshift, the output revolution speed of the engine is quickly and largely decreased. Therefore, the engine torque to be applied to the CVT mechanism as an input torque will be decreased. However, during this upshift the follower pulley is quickly accelerated, and the inertia moment of the follower pulley is increased due to the acceleration of the follower pulley. That is, the engine torque which is decreasing is actually consumed to increase the rotation speed of the drive system. Therefore, the conventional control system tends to determine that the input load to the CVT is decreased by the upshift. This determination may invite the shortage of the line pressure.

It is therefore an object of the present invention to provide a control system which further correctly determines an input load to a CVT upon taking account of the inertia due to shifting in order to enable a further suitable control of the line pressure to be applied to pulleys of the CVT.

A control system according to the present invention comprises a continuously variable transmission (CVT), a CVT pressure control valve, an engine revolution condition detecting means, an engine output calculating means, a rotational change condition calculating mean, an input load change amount calculating means, and a hydraulic pressure control means. The CVT comprises a driver pulley, a follower pulley and a belt intercoupling the pulleys and varies a transmission ratio. The CVT pressure control valve controls a pressure of a fluid to be supplied to the CVT. The engine revolution condition detecting means detects a revolution condition of an engine connected to the CVT. The engine output calculating means calculates an engine output on the basis of the engine revolution condition. The rotational change condition calculating means calculates a rotational change condition of a drive system including the engine and the CVT. The input load change amount calculating means calculates a change amount of an input load which is caused by an inertia and applied to the CVT, on the basis of the rotational change condition. The hydraulic pressure control means outputs a pressure control signal to the CVT pressure control valve on the basis of the engine output and the input load change amount.

BRIEF DESCRIPTION OF THE DRAWINGS

In the drawings, like reference numerals designate like parts and elements throughout all Figures, in which.

DETAILED DESCRIPTION OF THE INVENTION

Referring to FIGS. 1 to 10D, there is shown an embodiment of a control system for a continuously variable transmission (CVT) in accordance with the present invention.

Figure 1:
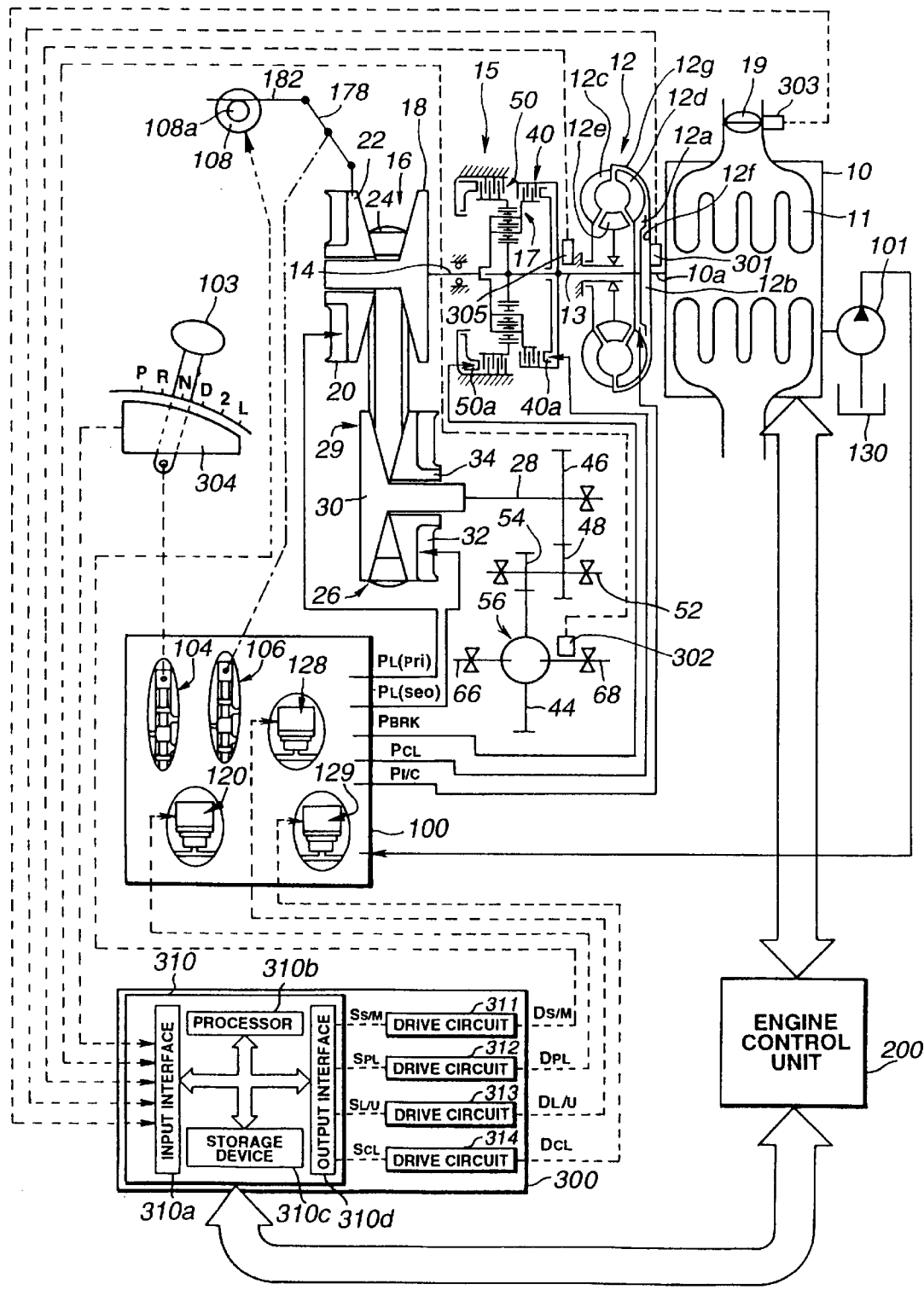
FIG. 1 is a schematic view showing a CVT and a control system thereof according to an embodiment of the present invention.

FIG. 1 shows an embodiment of the CVT and the control system thereof according to the present invention. A power transmission mechanism of the CVT is basically the same as that of a power transmission mechanism disclosed in a U.S. Pat. No. 5,697,866 except that a torque converter 12 is employed instead of a fluid coupling. Therefore, the same parts and elements of the power transmission mechanism are designated by same reference numerals, and a brief explanation thereof will be given hereinafter.

As shown in FIG. 1, an engine 10 is connected to a V-belt type CVT mechanism 29 through the torque converter 12 and a forward/reverse change over mechanism 15. An output shaft 28 of the CVT mechanism 29 is connected to a differential unit 56. These elements 10, 12, 29 and 56 constitute a so-called drive system. The drive system transmits rotation of an output shaft 10a of the engine 10 to right and left drive shaft 66 and 68 at a selected speed ratio in a selected rotational direction to drive a vehicle.

A throttle valve 19 is disposed in an air intake passage 11 of the engine 10 and is arranged to change a degree of its opening in response to a depression degree of an accelerator pedal (no numeral). A throttle opening sensor 303 is installed to the throttle valve 19 to detect a throttle opening TVO of the throttle valve 19 and to output a signal indicative of the throttle opening TVO. An engine revolution speed sensor 301 is installed on the output shaft 10*a* of the engine 10 to detect an engine revolution speed $N_E$ and to output a signal indicative of the engine revolution speed $N_E$. This engine revolution speed sensor 301 functions as an engine revolution speed change detecting means and a drive system rotational change condition detecting means (an actual rotational change condition detecting means).

The engine 10 is connected to an engine control unit 200 by which various engine operation factors such as fuel injection amount and timing and ignition timing are controlled so as to put the engine 10 in an optimum operating condition according to the running condition of the vehicle and a driver's intent.

The throttle opening TVO indicative signal outputted from the throttle opening sensor 303 also corresponds to the magnitude of the depression degree of the accelerator pedal. Although the engine revolution speed sensor 301 is arranged to detect the rotation speed of the output shaft 10*a* of the engine 10 in this embodiment, it will be understood that it may be arranged to count the number of ignition pulses of the engine 10 as an engine revolution speed.

The torque converter 12 of this drive system is a lockup torque converter of a known type. This lockup torque converter 12 comprises a pump impeller (input member) 12*c*, a turbine runner or turbine (output member) 12*d*, a stator 12*e*, and a lockup facing member (or lockup clutch) 12*f* for providing a direct mechanical drive by directly coupling the input and output members 12*c* and 12*d*. The lockup facing member 12*f* is connected with an output shaft (turbine shaft) 13. The lockup facing member 12*d* separates an apply side fluid chamber 12*a* and a release side fluid chamber 12*b*. The release chamber 12*b* is formed between a cover 12*g* of a torque converter 12 and the lockup facing member 12*f*, and the apply chamber 12*a* is disposed on the opposite side of the lockup facing member 12*f*. When a fluid pressure is supplied into the apply chamber 12*a*, the lockup facing member 12*f* is pressed against the cover 12*g*, and the torque converter 12 is put in a lockup state in which the input member 12*c* and the output member 12*d* are directly connected. When the fluid is supplied sufficiently into the release chamber 12*b*, the lockup facing member 12*f* is disengaged from the cover 12*g*, and the torque converter 12 is held in a non-lockup state (or unlockup state). The fluid pressure supplied to the release chamber 12*b* is drained through the apply chamber 12*a*.

An input rotation speed sensor 305 is installed on an output shaft 13 (turbine output shaft) of the torque converter 12 as a drive system rotation condition change detecting means (estimated rotational change condition detecting means) in order to detect an input rotation speed of the CVT mechanism 29.

When the vehicle is put in a normal running condition, the forward clutch 40 is put in a full engagement state. Therefore, the rotation speed of the turbine output shaft 13 is used as an input rotation speed $N_{Pri}$ of the CVT mechanism 29. When a foot of a driver is released from the accelerator pedal, the forward/reverse change over mechanism 15 functions to control a creep running force by variably adjusting the engagement force of the forward clutch 40. The fluid supplied to the release chamber 12*b* is drained through the apply chamber 12*a* to a reservoir 130, and a drained fluid of the fluid supplied to the apply chamber 12*c* is supplied from the release chamber 12*b* to other cooling and lubricating systems. That is, the selecting control between the lockup state and the unlockup state is executed by changing a flow direction of the fluid supplied to the lockup mechanism of the torque converter 12 as mentioned above without changing the fluid passage.

The forward/reverse drive direction change over mechanism 15 comprises a planetary gear system 17, the forward clutch 40 and a reverse brake 50. The planetary gear system 17 comprises multistage pinion trains and a pinion carrier supporting these pinion trains. The pinion carrier is connected to the driver pulley 16 of the CVT mechanism 29 through the driver pulley shaft 14, and a sun gear is connected to the turbine rotation shaft 13. The pinion carrier is engageable with the turbine rotation shaft 13 by means of the forward clutch 40. A ring gear of the planetary gear system 17 is engageable with a stationary housing.

The reverse brake 50 is disposed between a ring gear of the planetary gear system 17 and a stationary housing to hold the ring gear. When the forward clutch 40 is put in the engaged state by the supply of the fluid pressure to a fluid chamber 40*a*, the driver pulley shaft 14 and the turbine output shaft 13 are rotated in the same direction with equal speed through a pinion carrier. When the reverse brake 50 is engaged by the supply of the fluid pressure to the fluid chamber 50*a*, the driver pulley shaft 14 and the turbine output shaft 13 are rotated with equal speed but in the opposite direction.

The V-belt CVT mechanism 29 comprises a driver pulley 16, a follower (or driven) pulley 26, and a V-belt 24 for transmitting power between the pulleys. The driver pulley 16 is mounted on the driver pulley shaft 14. The driver pulley 16 comprises an axially stationary fixed conical disk 18, and an axially movable conical disk 22, which confront each other and define a V-shaped pulley groove therebetween for receiving the V-belt 24. The fixed disk 18 rotates as a unit with the driver shaft 14. By a fluid pressure in a driver pulley cylinder chamber 20, the movable disk 22 is axially movable.

The follower pulley 26 is mounted on a follower pulley shaft 28. The follower pulley 26 comprises an axially stationary fixed conical disk 30, a follower pulley cylinder chamber 32, and an axially movable conical disk 34. The fixed and movable disks 30 and 34 confront each other and define a V-shaped pulley groove for receiving the V belt 24. The fixed disk 30 rotates as a unit with the follower shaft 28. The movable disk 34 is axially movable in dependence on a fluid pressure in the follower pulley cylinder chamber 32.

The V-belt CVT mechanism 29 further comprises a stepping motor 108 controlled by a transmission control unit 300. A pinion 108*a* is connected to a rotation shaft of the stepping motor 108 and is meshed with a rack 182. An end of the rack 182 and the movable conical disk 22 are interconnected through a lever 178. By the operation of the stepping motor 108 according to the drive signal $D_{S/M}$ from the transmission control unit 300, the movable conical disk 22 of the driver pulley 16 and the movable conical disk 34 of the follower pulley 26 are axially moved to vary the effective radius of the contact position of each pulley of the driver and follower pulleys 16 and 26 axially. By so doing, the CVT mechanism 29 can vary the speed ratio (transmission ratio or pulley ratio) between the driver pulley 16 and the follower pulley 26.

The shift control system (pulley ratio varying control) is generally arranged to vary the pulley groove width of one of the driver and follower pulleys and allow the groove width of the other to be adjusted automatically. The arrangement is achieved by the belt of a push type which transmits the driving force mainly in the pushing direction. The push type V-belt 24 comprises a set of plates which are overlappingly arranged in the longitudinal direction or wound direction of the belt.

A drive gear 46 fixed to the follower pulley shaft 28 is meshed with an idler gear 48 formed on an idler shaft 52. A pinion gear 54 formed on the idler shaft 52 is meshed with a final gear 44 with which right and left drive shafts 66 and 68 are interconnected through the differential unit 56. A vehicle speed sensor 302 is installed on this final output shaft to detect a vehicle speed VSP and output a signal indicative of the vehicle speed VSP to the transmission control unit 300.

Next, a construction of a hydraulic pressure control apparatus of the CVT will be discussed. The hydraulic pressure control apparatus comprises a pump 101 driven by the engine 10. The pump 101 draws a working fluid from a reservoir 130 and supplies the fluid to an actuator unit 100 while applying a sufficient pressure to the fluid. The construction of the actuator unit 100 is basically the same as that of the actuator unit disclosed in a U.S. Pat. No. 5,697,866. Therefore, the same parts and elements are designated by same reference numerals, and only a brief explanation thereof will be given hereinafter.

A manual valve 104 is directly operated by a selector lever 103 so as to switchingly control a clutch pressure $P_{CL}$ to a cylinder chamber 40a of the forward clutch 40 and a brake pressure $P_{BRK}$ to a cylinder chamber 50a of the reverse brake 50.

An inhibitor switch 304 installed on the selector lever 103 detects a shift position selected by the selector lever 103 and outputs a shift range signal $S_{RANGE}$ indicative of the selected shift position. More particularly, the shift range signal $S_{RANGE}$ includes signals corresponding to P, R, N, D, 2, L according to the actually selected shift position.

A shift control valve 106 is controlled according to a relative displacement between the stepping motor 108 and the movable conical disk 22 of the driver pulley 16, more particularly it is controlled according to the movement of the lever 178. That is, the shift control valve 106 controls the fluid pressure (line pressure) $P_{L(Pri)}$ supplied to the driver pulley 16 according to a relative relationship between the required transmission ratio and a groove width of the driver pulley 16.

A lockup control duty valve 128 controls a lockup mechanism of the torque converter 12 so as to put the torque converter 12 in one of a lockup state and an unlockup state. A transmission control unit 300 outputs a drive signal $D_{L/U}$ to the lockup control valve 128 to operate the lockup mechanism of the torque converter 12. More particularly, when the drive signal $D_{L/U}$ indicative a large duty ratio is outputted to the lockup control duty valve 128, the torque converter 12 is put in the lockup state. When the drive signal $D_{L/U}$ indicative of a small duty ratio is outputted to the lockup control valve 128, the torque converter 12 is put in the unlockup (non-lockup) state.

A clutch engagement duty valve 129 controls an engagement force for one of the forward clutch 40 and the reverse brake 50 according to a drive signal $D_{CL}$ from the transmission control unit 300. When the drive signal $D_{CL}$ indicates a large duty ratio, one of the forward clutch 40 and the reverse brake 50 is engaged. When the drive signal $D_{CL}$ indicates a small duty ratio, it is disengaged.

A line pressure control duty valve 120 controls the line pressure $P_L$ supplied mainly to the follower pulley 26 and partly to the driver pulley 16 so as to hold the belt 24 by the pulleys 26, 16 according to a drive signal $D_{PL}$ from the transmission control unit 300. This duty valve 120 is represented as a modifier duty valve in the above cited Patent document. The reason for this is the output pressure from the duty valve 120 once functions as a pilot pressure of a pilot pressure control valve named as a pressure modifier valve. As a result, an output pressure from the pressure modifier valve functions as a pilot pressure of the line pressure control valve so as to control the line pressure $P_L$ produced in an upstream side of the line pressure control valve. That is, by controlling the duty ratio of the duty valve 120, the line pressure $P_L$ is indirectly controlled.

Figure 2:
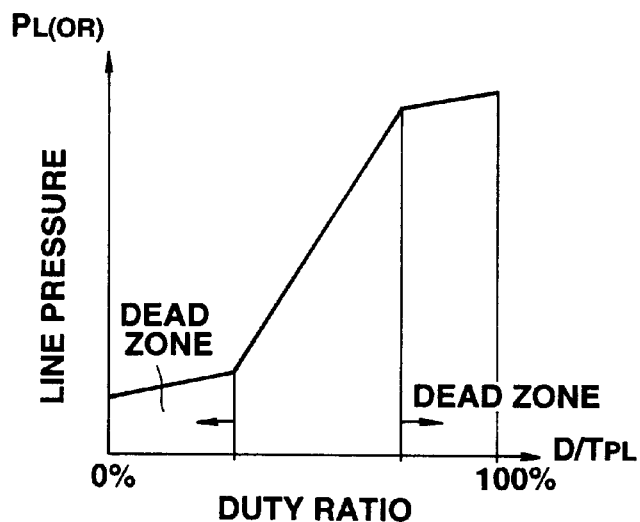
FIG. 2 is a graph showing a control map for setting a duty ratio of a duty valve for controlling a line pressure according to a target line pressure.
Figure 4:
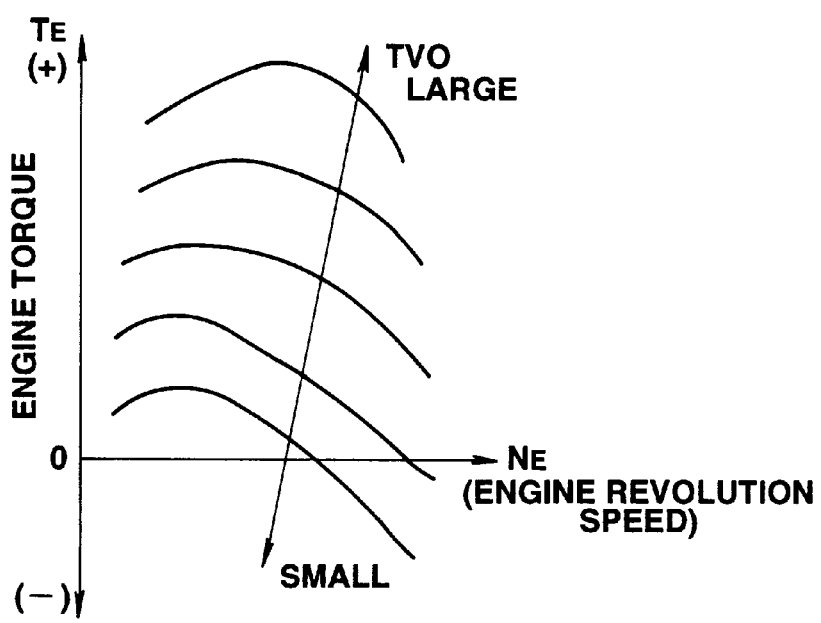
FIG. 4 is a graph showing a control map for setting an engine torque from an throttle opening and an engine revolution speed.

In this embodiment, the objective line pressure $P_{L(OR)}$ is linearly increased according to the increase of the control signal to the line pressure control duty valve 120 or duty ratio $D/T_{PL}$ of the drive signal except for dead zone as shown in FIG. 2. More particularly, when the output pressure of the pressure modifier valve is increased, the base (original) pressure of the clutch pressure and the base pressure of the lockup pressure of the torque converter 12 are simultaneously increased although the gradients and intercepts thereof are different respectively from others.

The transmission control unit 300 comprises a microcomputer 310 functioning as a control means, and four drive circuits 311 to 314. The microcomputer 310 outputs control signals for controlling the CVT mechanism 29 and the actuator unit 100 by executing a process shown by a flowchart of FIG. 3. The first to fourth drive circuits 311 to 314 respectively convert the control signals outputted from the microcomputer 310 into drive signals for practically controlling the actuators such as the stepping motor 108 and the respective duty valves 120, 128 and 129.

The microcomputer 310 comprises an input interface circuit 310a including an A/D converter, a calculation processor 310b such as a microprocessor, a storage device 310c such as ROM and RAM, and an output interface circuit 310d including a D/A converter.

The microcomputer 310 executes various operations such as obtaining a rotation angle of the stepping motor 108 for setting the actual transmission ratio, outputting a pulse signal $S_{S/M}$ for achieving the rotation angle, obtaining the optimum line pressure for holding the belt 24, calculating the duty ratio $D/T_{PL}$ of the line pressure control duty valve 120 for achieving the necessary line pressure $P_L$, obtaining the fluid pressure (torque converter pressure) $P_{T/C}$ for controlling the lockup mechanism of the torque converter 12, calculating the duty ratio $D/T_{L/U}$ of the lockup control duty valve 128 for achieving the torque converter pressure $P_{T/C}$, outputting a lockup control signal $S_{L/U}$ according to the lockup control duty ratio $D/T_{L/U}$, obtaining the fluid pressure (clutch pressure) $P_{CL}$ which is optimum to execute a creep running of the vehicle under when the accelerator pedal is put in the off condition (a foot of an operator is released from the accelerator pedal), calculating a duty ratio $D/T_{CL}$ of the clutch engagement control duty valve 129 necessary for achieving the required clutch pressure $P_{CL}$, outputting a clutch engagement control signal $S_{CL}$ according to the clutch pressure control duty ratio $D/T_{CL}$, and so on.

The first drive circuit 311 converts the pulse control signal $S_{S/M}$ into a drive signal $D_{S/M}$ and outputs it to the stepping motor 108. The second drive circuit 312 converts the pulse control signal $S_{PL}$ into a drive signal $D_{PL}$ and outputs it to the line pressure control duty valve 120. The third drive circuit 313 converts the pulse control signal $S_{L/U}$ into a drive signal $D_{L/U}$ and outputs it to the lockup control duty valve 128. The forth drive circuit 314 converts the pulse control signal $S_{CL}$ into a drive signal $D_{CL}$ and outputs it to the clutch engagement control duty valve 129. If the control signals according to the duty ratio and the pulse control signals satisfactorily indicate the desired duty ratios and number of pulses, the drive circuits 311 to 314 simply execute the amplifications thereof.

The engine control unit 200 also comprises a microcomputer which is interconnected with the microcomputer 310 of the transmission control unit 300 such that the engine 10 and the CVT are controlled according to the vehicle running condition.

Figure 3:
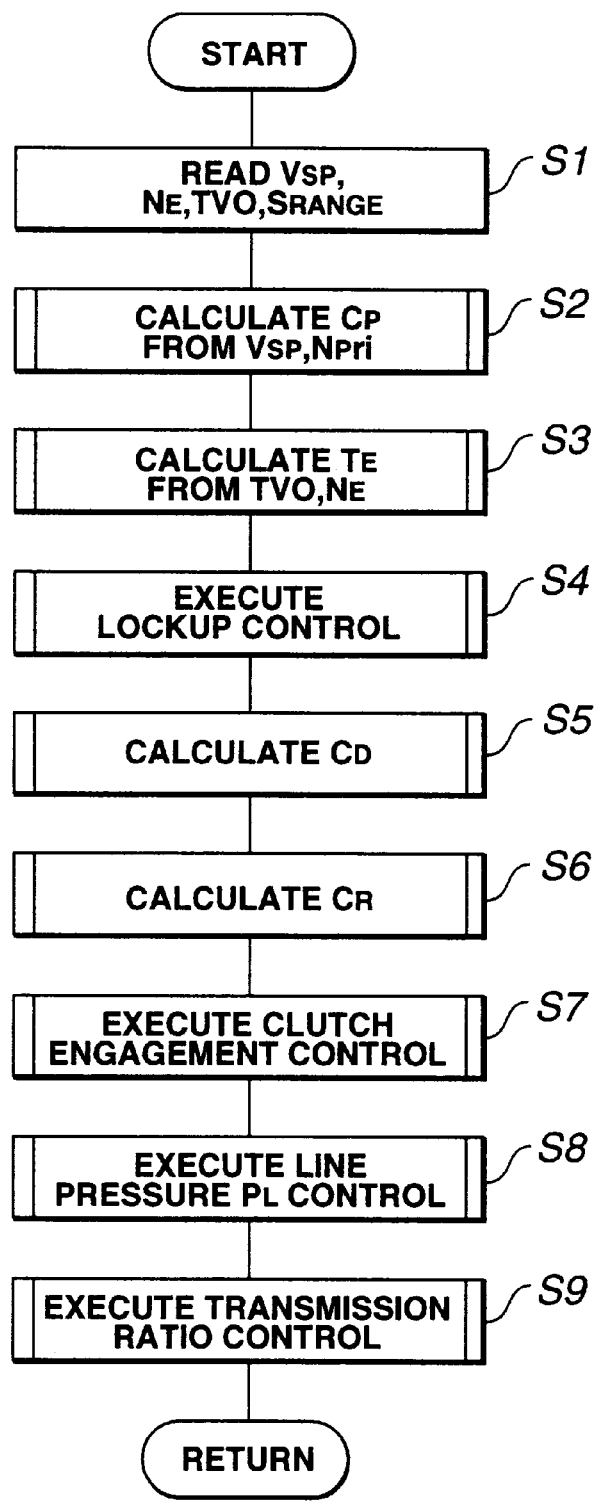
FIG. 3 is a flowchart showing a program executed by the transmission control unit of FIG. 1.
Figure 5:
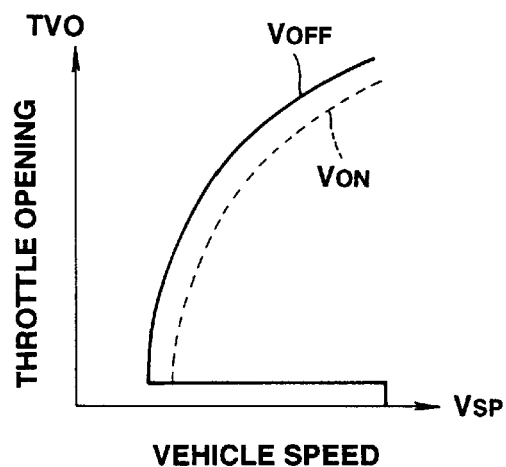
FIG. 5 is a graph showing a control map for setting a lockup vehicle speed and an unlockup vehicle speed from the vehicle speed and the throttle opening.

The transmission control of the present embodiment will be discussed with reference to a calculating process shown by a flowchart of FIG. 3 which is executed by the microcomputer 310. This calculating process is basically executed when the D-range is selected and when the engine control unit 200 requires no process to the transmission control unit 300. The detailed explanation of this shift control is disclosed in the U.S. Pat. No. 5,697,866.

Herein, a general flow of the shift control will be discussed. This calculating process is implemented as a timer interruption process at predetermined sampling time $\Delta T$ such as 10 milliseconds (msec). Although the flowchart of FIG. 3 does not show a step for a communication with others, the transmission control unit 300 timely executes a process for reading programs, maps and data used in the processor 310b from the storage device 310c and properly updates data calculated at the processor 310b and stores it in the storage device 310c.

At a step S1, the microcomputer 310 reads the signals indicative of the vehicle speed $V_{SP}$ outputted from the vehicle speed sensor 302, the engine revolution speed $N_E$ outputted from the engine revolution sensor 301, the input rotation speed $N_{Pri}$ outputted from the input rotation speed sensor 305, a throttle opening TVO outputted from the throttle, opening sensor 303 and a shift range signal $S_{RANGE}$ from the inhibitor switch 304.

At a step S2, the microcomputer 310 calculates a present transmission ratio $C_P$ according to the vehicle speed $V_{SP}$ and the input rotation speed $N_{Pri}$ by executing an independently provided process (sub routine). More particularly, the output rotation speed $N_{Sec}$ of the CVT mechanism 29 is obtained by dividing the vehicle speed $V_{SP}$ in proportion with the final output shaft rotation speed by a final reduction speed ratio n ($N_{Sec}=V_{SP}/n$), and the present transmission ratio $C_P$ is obtained by dividing the input rotation speed $N_{Pri}$ by the obtained output rotation speed $N_{Sec}$ ($C_P=N_{Pri}/N_{Sec}$) At a step S3, the microcomputer 310 calculates the engine torque $T_E$ on the basis of the throttle opening TVO and the engine revolution speed $N_E$ by executing an independently provided process (sub routine) such as a retrieval of a control map. More particularly, the present engine torque $T_E$ is obtained from the output characteristic map shown in FIG. 4 according to the throttle opening TVO and the engine revolution speed $N_E$.

At a step S4, the microcomputer 310 executes a lockup control by jumping the routine to an independently provided process (subroutine). More particularly, a lockup speed $V_{ON}$ and an unlockup speed $V_{OFF}$ are determined by using a control map shown in FIG. 5 according to the vehicle speed $V_{SP}$ and the throttle opening TVO. Basically, when the vehicle speed $V_{SP}$ is greater than the lockup speed $V_{ON}$, the microcomputer 310 generates and outputs the control signal $S_{L/U}$ including a lockup command for putting the torque converter 12 into the lockup state. When smaller than the unlockup speed $V_{OFF}$, the microcomputer 310 generates and outputs the control signal $S_{L/U}$ including an unlockup command for putting the torque converter 12 into the unlockup state. In particular, in case that the condition of the torque converter 12 is changed from the unlockup state to the lockup state, when a difference between the engine rotation speed $N_E$ and the input rotation speed $N_{Pri}$ is greater than a predetermined value, that is, when a difference between the engine revolution speed $N_E$ and the rotation speed of the turbine of the torque converter 12 is greater than the predetermined value, a gain employed for increasing the duty ratio $D/T_{L/U}$ is increased according to the magnitude of the difference. When the difference is smaller than a predetermined value, that is, when the torque converter 12 tends to be put in the lockup state, the gain for increasing the duty ratio $D/T_{L/U}$ is decreased so as to buffer shift shocks caused by the transition to the full lockup state.

Figure 6:
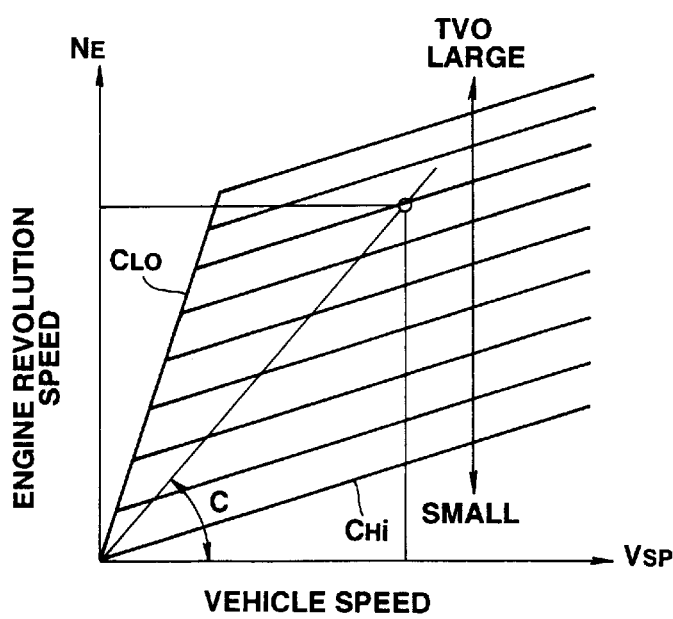
FIG. 6 is a graph showing a control map for setting a transmission ratio from the throttle opening and the vehicle speed.

At a step S5, the microcomputer 310 calculates a goal transmission ratio $C_D$ by executing an independently provided process (subroutine) such as the retrieval of a control map. The goal transmission ratio $C_D$ is the most ideal transmission ratio for achieving the present engine revolution speed $N_E$ from the vehicle speed and the throttle opening TVO. More particularly, as shown in FIG. 6, if a transmission ratio C, by which the vehicle speed $V_{SP}$, the throttle opening TVO and the engine revolution speed $N_E$ are completely matched, is set, it is possible to ensure an acceleration according to the depression degree of the accelerator pedal (the throttle opening TVO) while satisfying the vehicle speed $V_{SP}$ and the engine revolution speed $N_E$. Herein, if it is assumed that the map shown in FIG. 6 is the control map for setting the goal transmission ratio $C_D$, a straight line crossing with an origin point and having a constant gradient is a constant transmission ratio. For example, a straight line having the largest gradient in the whole area of the shift pattern is the largest speed reduction ratio of the vehicle, that is, a maximum transmission ratio $C_{LO}$. In reverse, a straight line having the smallest gradient in the whole area of the shift pattern is the smallest speed reduction ratio of the vehicle, that is, a minimum transmission ratio $C_{DHi}$. Herein, if the 2-range is selected through the select lever 103, the shift control is implemented within an area from the maximum transmission ratio $C_{LO}$ to a 2-range minimum transmission ratio $C_{2Hi}$.

At a step S6, the microcomputer 310 calculates the objective transmission ratio $C_R$ according to an individually prepared process (subroutine). More particularly, when the goal transmission ratio $C_D$ is greater than the present transmission ratio $C_P$, the objective transmission ratio $C_R$ is set to execute the downshift. When smaller than the present transmission ratio $C_P$, the objective transmission ratio $C_R$ is set to execute the upshift. For example, the objective transmission ratio $C_R$ is set at a transmission ratio obtained at a moment elapsing a predetermined sampling time $\Delta T$ from when the shifting is executed from the present transmission ratio $C_P$ by the highest shift speed $dC_R/dt$ or smallest time constant τ. Herein, if the throttle opening TVO is decreased from a nearly full open state, that is, when the depression degree of the accelerator pedal is decreased, the shift speed $dC_R/dt$ is little decreased or the time constant τ is little increased. Further, when the throttle opening TVO is further quickly decreased, such that the depression of the accelerator pedal is cancelled, the shift speed $dC_R/dt$ is further decreased or the time constant $\tau$ is further increased. That is to say, the objective transmission ratio $C_R$ is changed according to the closing change amount of the throttle valve 19.

In this embodiment, the time constant $\tau$ is employed in order to set the objective transmission ratio $C_R$, that is, to control the shift speed. Therefore, when the goal transmission ratio $C_D$ is set, the objective transmission ratio $C_R$ is determined as a curve which takes values gradually converging to the goal transmission ratio $C_D$.

At a step S7, the microcomputer 310 executes a clutch engagement control according to an individually provided process (subroutine). More particularly, as a basic manner, when the vehicle speed $V_{SP}$ is greater than a creep control threshold, the forward clutch 40 is engaged. When the vehicle speed $V_{SP}$ is smaller than the creep control threshold and when the throttle opening TVO is greater than a creep control full close threshold, the engagement of the forward clutch 40 is released. Such operations are executed by generating and outputting the corresponding signal $S_{CL}$ from the microcomputer 310 to the fourth drive circuit 314. When the vehicle speed $V_{SP}$ is smaller that the creep control threshold and when the throttle opening TVO is smaller than the full close threshold, the gain for changing the duty ratio $D/T_{CL}$ is changed in inverse proportion to the difference between the engine revolution speed $N_E$ and the input rotation speed $N_{Pri}$ (turbine output shaft rotation speed). By this arrangement, the engagement force of the clutch 40 is decreased if the vehicle tends to generate a creep running due to a road condition such as a up-slope road running condition, and the engagement force of the clutch 40 is increased if the vehicle does not tend to generate a creep running.

Figure 7:
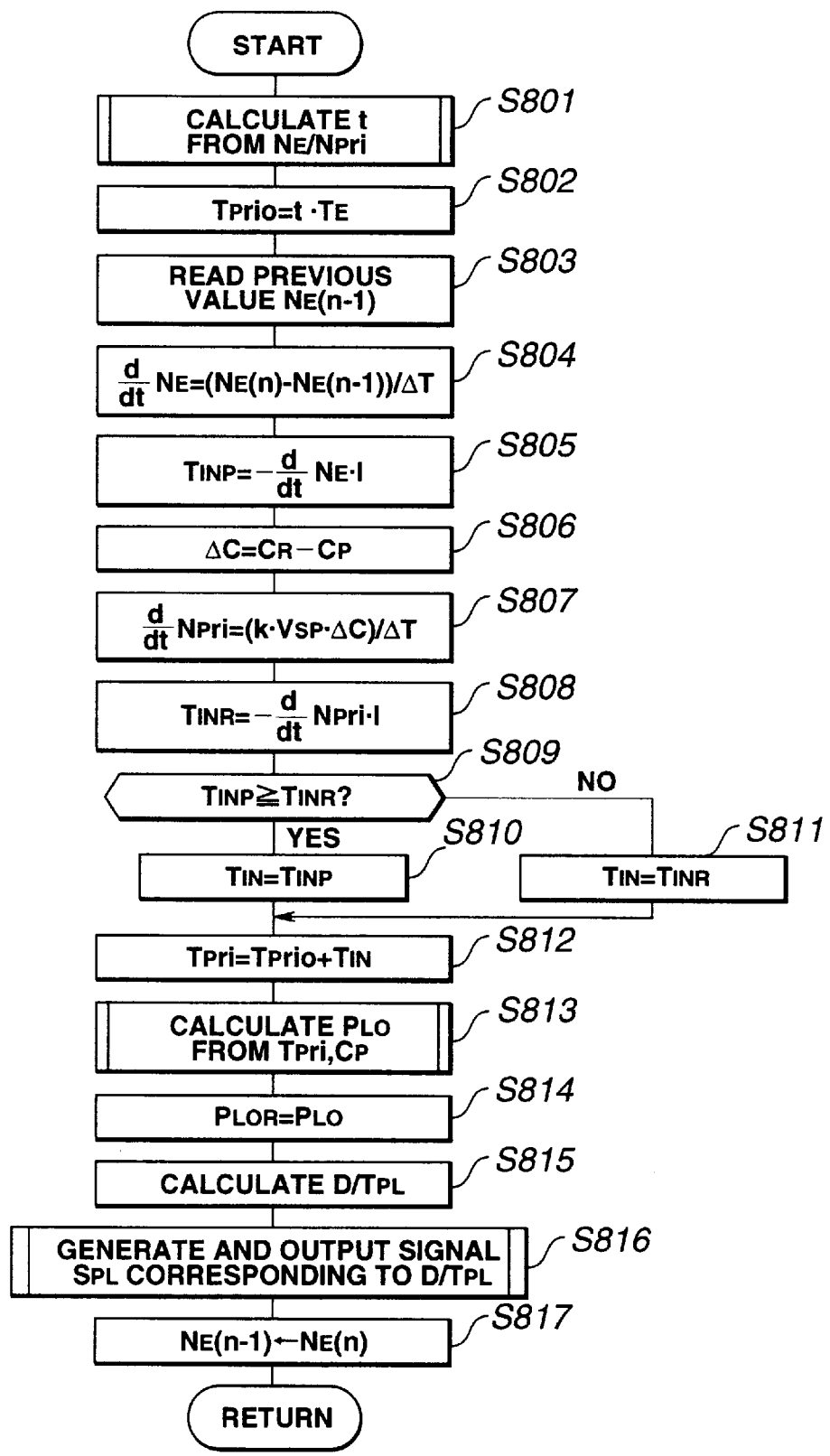
FIG. 7 is a flowchart showing a miner program of a calculation process step of FIG. 3.
Figure 8:
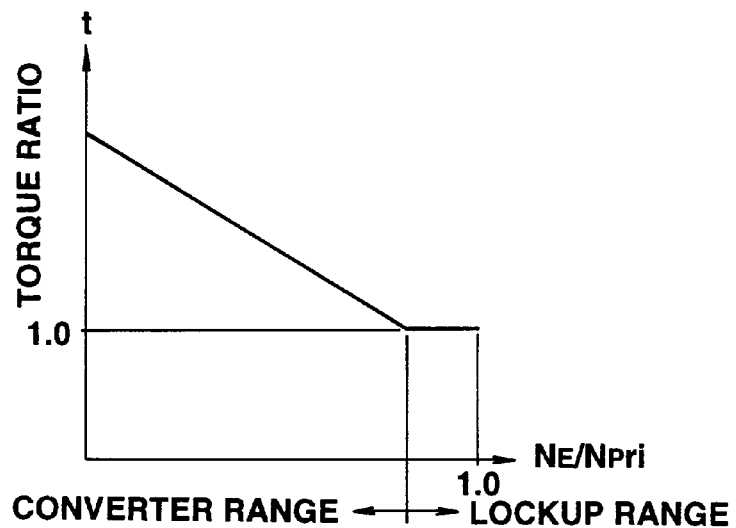
FIG. 8 is a graph showing a control map for setting a torque ratio from the torque converter input and output speed ratio.

At a step S8, the microcomputer 310 executes the control of the line pressure $P_L$ according to the process shown by a flowchart of FIG. 7. The detailed explanation of this line pressure control will be done later with reference to the flowchart of FIG. 7.

At a step S9, the microcomputer 310 executes a transmission ratio control according to an individually prepared process (subroutine). More particularly, with respect to the objective transmission ratio $C_R$, the total number of the pulses and the number of pulses per a unit time are determined. Then, the microcomputer 310 generates and outputs the pulse control signal $S_{S/M}$ satisfying the both numbers. After the execution of the step S9, the routine of this program returns to the main program.

Next, the line pressure control executed at the step S8 of the flowchart of FIG. 3 will be discussed in detail with reference to the flowchart of FIG. 7.

At a step S801, the microcomputer 310 calculates a torque ratio t of the torque converter 12 from the speed ratio $N_E/N_{Pri}$ by executing the individually provided calculation such as the retrieval of the control map. More particularly, the torque converter input and output speed ratio $N_E/N_{Pri}$ is obtained by dividing the engine revolution speed $N_E$ by the input rotation speed $N_{Pri}$ equal to the turbine output rotation speed. The microcomputer 310 determines according to the torque converter input and output speed ratio $N_E/N_{Pri}$ whether the torque converter 12 is put in the unlockup (converter) state or the lockup state. Further, the microcomputer 310 computes the torque ratio t according to the torque converter input and output speed ratio if the unlock state.

At a step S802, the microcomputer 310 calculates a reference input torque $T_{Prio}$ by multiplying the torque ratio t by the engine torque $T_E$.

At a step S803, the microcomputer 310 reads a previous engine revolution speed $N_{E(n-1)}$ which is a value detected in the previous routine and stored in the storage device 310 while being updated.

At a step S804, the microcomputer 310 calculates a rate $dN_E/dt$ of change in the engine revolution speed $N_E$ per time from the following equation (1).

$$dN_E/dt=(N_{E(n)}-N_{E(n-1)})/\Delta T \qquad (1)$$

where $N_{E(n)}$ is a present value of the engine revolution speed read at the step S1.

At a step S805, the microcomputer 310 calculates a feedback inertia torque $T_{INP}$ by multiplying the opposite number of the rate $dN_E/dt$ by an inertia moment I of the drive system (hereinafter, calling as an inertia coefficient) as follows:

$$T_{INP}=-(dN_E/dt)\cdot I \qquad (2)$$

At a step S806, the microcomputer 310 calculates an estimated shift amount $\Delta C$ by subtracting the present transmission ratio $C_P$ from the objective transmission ratio $C_R (\Delta C=C_R-C_P)$.

At a step S807, the microcomputer 310 calculates a rate $dN_{Pri}/dt$ of change in the input rotation speed $N_{Pri}$ from the following equation (3).

$$dN_{Pri}/dt=(k\cdot V_{SP}\cdot \Delta C)/\Delta T \qquad (3)$$

where k is a coefficient constituted by an inverse number of the final reduction speed ratio necessary for calculating the output rotation speed $N_{Sec}$ from the vehicle speed $V_{SP}$.

At a step S808, the microcomputer 310 calculates a feedforward inertia torque $T_{INR}$ by multiplying an opposite number of the rate $(dN_{Pri}/dt)$ of the input rotation speed by the inertia coefficient I as follows:

$$T_{INR}=-(dN_{Pri}/dt)\cdot I \qquad (4)$$

At a step S809, the microcomputer 310 determines as to whether or not the feedback inertia torque $T_{INP}$ is greater than or equal to the feedforward inertia torque $T_{INR}$. When the determination at the step S809 is affirmative, the routine proceeds to a step S810 wherein the feedback inertia torque $T_{INP}$ is selected as a representative inertia torque $T_{IN}$ ($T_{IN}=T_{INP}$). When the determination at the step S809 is negative, the routine proceeds to a step S811 wherein the feedforward inertia torque $T_{INR}$ is selected as the representative inertia torque $T_{IN}$ ($T_{IN}=T_{INR}$).

After the execution of the step S810 or S811, the routine proceeds to a step S812 wherein the sum of the inertia torque $T_{IN}$ and the reference inertia torque $T_{Pri}$ is treated as the input toque $T_{Pri}$ ($T_{Pri}=T_{Pri0}+T_{IN}$)

Figure 9:
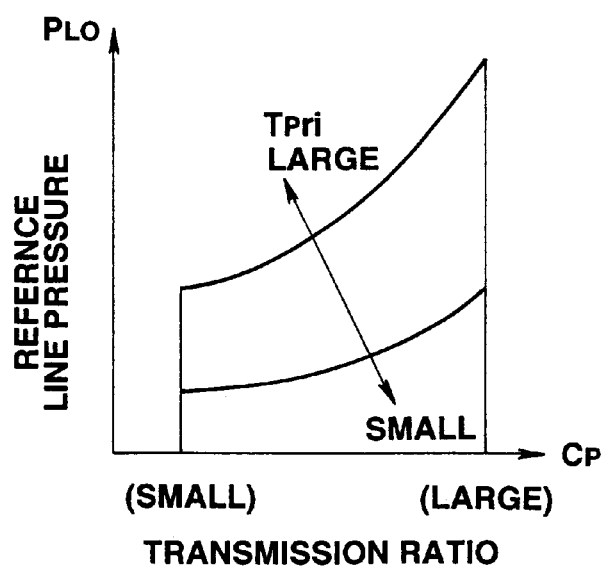
FIG. 9 is a graph showing a control map for setting a reference pressure from an input torque and the transmission ratio.

At a step S813, the microcomputer 310 calculates (computes) the reference line pressure $P_{LO}$ from the control map of FIG. 9 according to the input torque $T_{Pri}$ and the present transmission ratio $C_P$. The control map of FIG. 9 defines the reference line pressure according to the input torque $T_{Pri}$ and the present transmission ratio $C_P$. Since the line pressure $P_L$ functions to apply a load to a side surface of the belt 24 through the pulleys 16 and 26, it is preferable to decrease the line pressure $P_L$ in view of the durability and the energy efficiency. In contrast, since the belt 24 receives and transmits the torque, it is necessary to hold the belt 24 between the conical disks of each pulley 16, 26 so as not to lose the torque between the belt and pulleys. Therefore, it is necessary to increase the line pressure $P_L$ according to the increase of the input torque $T_{Pri}$ and/or the increase of the transmission ratio $C_P$ since the torque is increased according to the increase of the transmission ratio $C_O$ and/or the transmission ratio $C_P$. The reference line pressure $P_{LO}$ is determined only from the transmission ratio $C_P$ and the input torque $T_{Pri}$ and is set far smaller than the value affecting the durability of the belt 24.

At a step S814, the microcomputer 310 determines the reference line pressure $P_{LO}$ as the present value $P_{LOR(n)}$ of the objective line pressure.

At a step S815, the microcomputer 310 calculates (computes) the line pressure control duty ratio $D/T_{PL}$ for achieving the objective line pressure $P_{LOR}$ from the control map of FIG. 2.

At a step S816, the microcomputer 310 generates and outputs the line pressure control signal $S_{PL}$ corresponding to the line pressure control duty ratio $D/T_{PL}$ by executing an individually provided process (subroutine).

At a step S817, the microcomputer 310 updates the previous value $N_{E(n-1)}$ by the present engine revolution speed $N_{E(n)}$ and stores the updated value $N_E$ as a previous value. Then, the routine returns to the step S9 of FIG. 3. Since the control map of the duty line pressure control duty ratio $D/T_{PL}$ may employ a known duty ratio control, the explanation thereof will be omitted herein. Further, the generation of the line pressure control signal $S_{PL}$ corresponding to the line pressure duty ratio $D/T_{PL}$ may employ a known PWM (Pulse Width Modulation) control, and therefore the explanation thereof will be omitted herein.

The function of the shift control of the flowchart of FIG. 7 will be discussed in detail.

By the execution of the steps S801 and S802, the reference input torque $T_{Pri0}$, inputted to the CVT mechanism 29 is calculated by multiplying the engine torque $T_E$ by the torque ratio t.

By the execution of the steps S803 to S805, the feedback inertia torque $T_{INP}$ is calculated.

By the execution of the steps S806 to S808, the feedforward inertia torque $T_{INR}$ is calculated.

As mentioned above, when the rotational condition of an object is changed, more accurately, when an acceleration is applied to the rotational direction of the object, an inertia moment is applied to the subject. Since it may be assumed that the inertia moment is an inertia torque, a product of the acceleration applied to the drive system (a rate of change in rotation speed per a unit time) and the inertia coefficient I of the drive system may be treated as an inertia torque inputted to the drive system (a change amount of the input load according to the change of the rotation).

At the step S804, an acceleration applied to the drive system is obtained from the rate $dN_E/dt$ of the actual engine revolution speed $N_E$. At the step S805, the feedback inertia torque $T_{INP}$ is calculated by multiplying the obtained acceleration by the inertia coefficient I.

On the other hand, at the steps S806 and S807, an acceleration (angular acceleration) applied to the drive system is obtained from the rate $dN_{Pri}/dt$ of the input rotation speed $N_{Pri}$ achieved by the present objective transmission ratio. Next, at the step S808, the feedforward inertia torque $T_{INR}$ is obtained by multiplying the rate $dN_{Pri}/dt$ by the inertia coefficient I ($T_{INR}=dN_{Pri}/dt \cdot I$). The words "feedback" and "feedforward" in this embodiment are used to mean an object obtained from the actual rotational change condition and an object obtained from a future rotational change condition. That is, the former word corresponds to "actual", and the latter word corresponds to "estimated". Therefore, the feedback inertia torque may be represented as an actual change amount of the input load, and the feedforward inertia torque may be represented as an estimated change amount of the input load.

In this embodiment, the opposite values of the change speed $dN_E/dt$ of the engine revolution speed $N_E$ and the change speed $dN_{Pri}/dt$ of the input rotation speed $N_{Pri}$ are used to calculate the feedback inertia torque $T_{INP}$ and the feedforward inertia torque $T_{INR}$ by means of the equations (2) and (4), the reason for this is that the inertia torque caused during the upshift (the transmission ratio is decreased) is also taken account. That is, the inertia torque caused by the rotational change of the drive system has a direction according to the increase and decrease of the change amount of the input load. The increase of the rotational change of the drive system is mainly caused by the increase of the engine revolution speed $N_E$ and the upshift (the transmission ratio C is decreased). In case that the engine revolution speed $N_E$ is increased, the increased amount of the input torque caused by the increase of the engine revolution speed $N_E$ is already included in the engine torque $T_E$ and is relatively slowly changed. Therefore, the inertia torque functioning as the change amount of the input load to the CVT mechanism 29 is relatively small, and it is possible to adapt to the inertia torque by setting the gain of the control system at a relatively large value, or by superimposing the estimated maximum inertia torque as a drift amount. On the other hand, the inertia torque caused by the upshift (the transmission ratio is steppingly decreased) is not small and is unstable in magnitude. The detailed explanation of this inertia torque caused by the upshift will be discussed later.

In case of such stepping upshift, the transmission ratio is decreased quickly (relatively), and therefore the input rotation speed $N_{Pri}$ and the engine revolution speed $N_E$ are decreased also quickly although the increase of the vehicle speed $V_{SP}$ is not so quick. That is, the magnitude of the inertia torque functioning as an input load change amount to the CVT mechanism 29 becomes large according to the magnitude of the change speed. It will be understood that this inertia torque is an inertia torque absorbed by the drive line. In contrast to the increase of the inertia torque, the control input such as the input rotation speed $N_{Pri}$ and the engine revolution speed $N_E$ is decreased. Therefore, it may be considered that the inertia torque $T_{IN}$ is in proportion with the input deceleration. In order to clarify the directions therebetween, the opposite values of the change speed $dN_E/dt$ of the engine revolution speed $N_E$ and the change speed $dN_{Pri}/dt$ of the input rotation speed $N_{Pri}$ are used to determine the inertia torque $T_{IN}$. In case that a downshift is executed steppingly, the inertia torque of the drive system becomes small, and the engine revolution speed $N_E$ and the input rotation speed $N_{Pri}$ are increased. Therefore, it will be understood that the above-mentioned setting manner of the inertia torque is proper.

At the steps S809 to S811, the larger one of the feedback inertia torque $T_{INP}$ and the feedforward inertia torque $T_{INR}$ is selected as the inertia torque $T_{IN}$. At the steps S812 and S813, the reference line pressure $P_{LO}$ is determined in correspondence with the input torque $T_{Pri}$ which is the sum of the inertia torque $T_{IN}$ and the reference input torque $T_{Pri0}$. Thereafter, at the steps S815 and S816, the line pressure control signal $S_{PL}$ is generated and outputted.

With reference to time charts of FIGS. 10A to 10D, the manner of operation as to the determination of the inertia toque $T_{IN}$ will be discussed hereinafter.

Figure 10A:
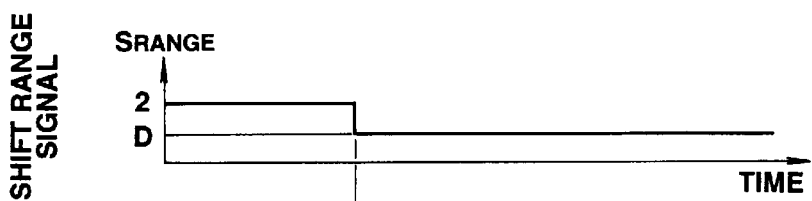
FIGS. 10A to 10D are time charts for explaining operations of the process of FIG. 7.
Figure 10B:
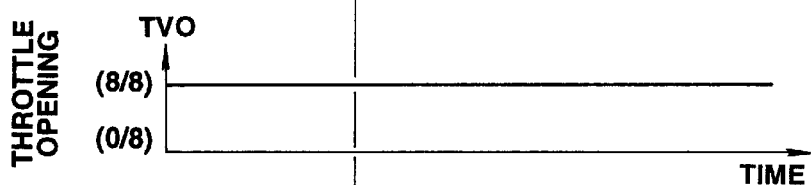
Figure 10C:
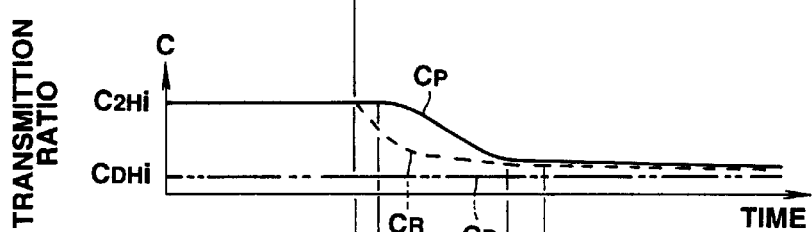

These time charts indicate a result of a simulation executed under the condition that goal transmission ratio $C_D$ shown in the control map of FIG. 6 was upshifted steppingly, that is, a condition that at moment to, a shifting was executed from 2-range to D-range when the torque converter 12 was maintained at the lockup state and when the vehicle speed $V_{SP}$ and the throttle opening TVO were kept high and constant, as shown by alternate long and two short dashes line of FIG. 10C. In contrast, the present embodiment according to the present invention is arranged to determine the objective transmission ratio $C_R$ so as to gradually approach the goal transmission ratio $C_D$ by controlling the time constant τ, as shown by a short dashes line of FIG. 10C. Although the shift control is executed so that the actual transmission ratio $C_P$ is adjusted to the objective transmission ratio $C_R$, the actual transmission ratio $C_P$ is practically changed with a corresponding delay as shown by a continuous line of FIG. 10C.

Figure 10D:
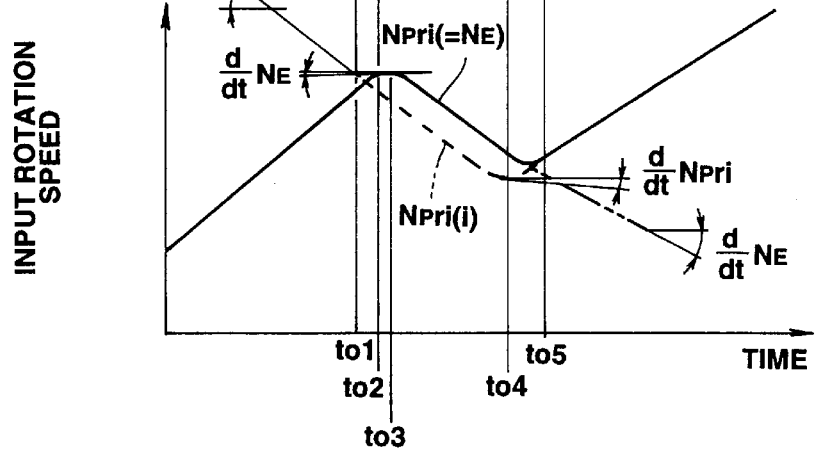

On the other hand, since the torque converter 12 is put in the lockup state, the engine revolution speed $N_E$ and the input rotation speed $N_{Pri}$ are equal with each other. The actual input rotation speed $N_{Pri}$ was increased by a constant gradient until the moment $t_{01}$. Then, the gradient indicative of an increase rate of the input rotation speed $N_{Pri}$ became small from moment $t_{02}$ in FIG. 10D. At the moment $t_{03}$ the input rotation speed $N_{Pri}$ started decreasing. Thereafter, the actual input rotation speed $N_{Pri}$ continued decreasing. Just before moment $t_{05}$ when the transmission ratio $C_P$ asymptotically approached the goal transmission ratio $C_D$, the input rotation speed $N_{Pri}$ started increasing. Thereafter, the input rotation speed $N_{Pri}$ continued increasing. That is, the upshift of the actual transmission ratio $C_P$ was started at the moment $t_{02}$ and terminated just before the moment $t_{05}$. In contrast, a short dashes line of FIG. 10D shows an estimated input rotation speed $N_{Pri(i)}$ which is obtained by executing the estimation thereof upon being assumed that the objective transmission ratio $C_R$ is achieved simultaneously with the execution of the process of FIG. 3, that is, it is achieved in real time. Since it is assumed that the objective transmission ratio $C_R$ is achieved in real time with respect to the actual transmission ratio $C_P$ including the response delay, the estimated input rotation speed $N_{Pri(i)}$ starts decreasing prior to the actual input rotation speed $N_{Pri}$ and starts increasing prior to the actual input rotation speed $N_{Pri}$.

Herein, a consideration as to the actual input rotation speed $N_{Pri}$ will be given. Although the actual input rotation speed $N_{Pri}$ is represented as a result of the execution of the actual upshift, the inertia torque indicative of the change amount of the input load to the CVT mechanism 29 is increased during the shifting. That is, the shifting is executed while the inertia torque is absorbed by the drive line. As a result, the actual input rotation speed $N_{Pri}$ (=$N_E$) is decreased. Therefore, the feedback inertia torque $T_{INP}$ obtained from the change speed ($dN_E/dt$) will delay as compared with the timing taking account of the inertia torque. Therefore, if only the feedback inertia torque $T_{INP}$ is employed to calculate the line pressure $P_L$, the shortage of the line pressure $P_L$ may be caused with respect to the total input load to the CVT mechanism 29. In order to avoid such a shortage of the line pressure $P_L$, the feedforward inertia $T_{INR}$ is calculated from the change speed of the input rotation speed $N_{Pri}$ obtained from the estimated input rotation speed $N_{Pri(i)}$, which change speed is faster than the feedback inertia $T_{INP}$ in phase. Further, the larger one of the feedback inertia torque $T_{INP}$ and the feedforward inertia torque $T_{INR}$ is selected as a representative inertia torque $T_{IN}$. That is, during the upshift, the negative gradients of the actual input rotation speed $N_{Pri}$ and the estimated input rotation speed $N_{Pri(i)}$ are compared, and the larger one of them is selected as the representative inertia torque $T_{IN}$ to avoid the shortage of the line pressure $P_L$.

As shown in FIGS. 10A to 10D, at the moment $t_{03}$ when the actual shifting has just been started, the negative gradient of the change speed $dN_E/dt$ of the engine rotation speed is still small. But the negative gradient of the change speed $dN_{Pri}/dt$ of the input rotation speed $N_{Pri}$ has already been large. Therefore, at the moment $t_{03}$ the feedforward inertia torque $T_{INR}$ is greater than the feedback inertia torque $T_{INP}$, and the actually generated inertia torque may become large. Accordingly, the feedforward inertia torque $T_{INR}$ is selected as the representative inertia torque $T_{IN}$.

On the other hand, at the moment $t_{04}$ when the actual transmission ratio $C_P$ is not converged, the actual transmission ratio $C_P$ starts convergence. Therefore, the negative gradient of the change speed $dN_{Pri}/dt$ becomes small, and the negative gradient of the engine speed change speed $dN_E/dt$ is yet large. Therefore, the feedback inertia torque $T_{INP}$ becomes greater than the feedforward inertia torque $T_{IN}$. Even if the shifting is not converged (starts to converge), the actually generated inertia torque is still large. Therefore, the feedback inertia torque $T_{INP}$ is selected as the representative inertia torque $T_{IN}$. Accordingly, the representative inertia torque $T_{IN}$ takes a sufficiently large value to set the line pressure $P_L$ at a sufficient value satisfactorily preventing the slippage of the belt.

The line pressure duty valve 120 constitutes a control valve of the CVT mechanism 29 according to the present invention. The engine revolution speed sensor 301 and the step S1 shown in FIG. 3 constitutes an internal combustion engine rotation condition detecting means. The step S3 of FIG. 3 and the steps S801 and S802 of FIG. 7 constitute an internal combustion engine output detecting means. The steps S803 and S804 of FIG. 7 constitute the actual rotational change condition detecting means. The steps S5 and S6 of FIG. 3 and the steps S806 and S807 of FIG. 7 constitute an estimated rotational change condition detecting means. The actual rotational change condition detecting means and the estimated rotational change condition detecting means constitute a rotational change condition detecting means. The step S805 of FIG. 7 constitutes an actual input load change amount calculating means. The step S808 of FIG. 7 constitutes an estimated input load change amount calculating means. The actual input load change amount calculating means and the estimated input load change amount calculating means constitute the input load change amount calculating means. The steps S809 to S811 of FIG. 7 constitute a selecting means. The steps S812 to S816 constitute a hydraulic fluid pressure control means.

With the thus arranged control system according to the present invention, the input load change amount generated by the inertia is detected by detecting the rotational condition of the drive system. Further, the working fluid pressure applied to the CVT mechanism is controlled at a predetermined pressure according to a command signal outputted from the control unit to the CVT pressure control valve on the basis of the input load change amount and the output of the engine. This effectively functions to compensate the input load hange amount which tends to be short when the transmission ratio is decreased. Therefore, the fluid pressure supplied to the pulleys of the CVT mechanism is controlled at a proper value.

Further, since the control system is arranged to directly detect the rotational condition of the drive system and to obtain the actual rotational change condition from the detected rotational condition and to calculating the actual input load change amount generated by the inertia by multiplying the actual rotational change condition detection value with a predetermined inertia coefficient, it is possible to accurately obtain the total input load change amount caused by the inertia during a period from the start of an actual shift to the convergence of the actual shift. This improves the control performance of the control system.

Additionally, by detecting the estimated rotational change condition achieved from the transmission ratio control condition and by calculating the estimated input load change amount caused by the inertia by multiplying the estimated rotational change condition indicative value with the predetermined inertia coefficient, it is possible to accurately obtain the total input load change amount caused by the inertia during a period from the start of the shift control to the start of the actual shift. This similarly improves the control performance of the control system.

Furthermore, the actual rotational change condition is detected by directly detecting the rotational condition of the drive system, and an estimated rotational change condition achieved from the transmission ratio control condition is calculated. The actual input load change amount caused by the inertia is calculated by multiplying the actual rotational change condition detection value by a predetermined inertial constant, and the estimated input load change amount is calculated by multiplying the estimated rotational change condition detection value by a predetermined inertia coefficient. Larger one of the actual input load change amount and the estimated input load change amount is selected as an input load change amount so as to further increase the input load to the CVT mechanism.

Although the preferred embodiment according to the present invention has been shown and described to employ a normal selector lever and an inhibitor switch, it will be understood that a selector lever having a manual valve and an inhibitor switch disclosed in a Japanese Patent Provisional Publication No. 2-125174 may be employed instead of the normal lever and switch. This selector lever having the manual valve is arranged to enable the execution of the intended shift command (upshift command, downshift command) under the D-range.

Although the preferred embodiment has been shown and described such that the control unit thereof is constituted by a microcomputer, it will be understood that a combination of electronic circuits such as calculating circuits may be employed in the control unit instead of the microcomputer.

While the preferred embodiment has been shown and described such that the control system according to the present invention is applied to a belt type continuously variable transmission, it is of course that the control system according to the present invention may be applied to a toroidal type continuously variable transmission.

What is claimed is:
1. A control system comprising:
a continuously variable transmission (CVT) comprising a driver pulley, a follower pulley and a belt intercoupling the pulleys, said CVT varying a transmission ratio by changing effective diameters of the pulleys;
a CVT pressure control valve controlling a pressure of a fluid to be supplied to said CVT;
an engine revolution condition detecting means for detecting a revolution condition of an engine connected to said CVT;
an engine output calculating means for calculating an engine output on the basis of the engine revolution condition;
a rotational change condition calculating means for calculating a rotational change condition of a drive system including the engine and said CVT;
an input load change amount calculating means for calculating a change amount of an input load which is caused by an inertia and applied to said CVT, on the basis of the rotational condition; and
a hydraulic pressure control means for outputting a pressure control signal to said CVT pressure control valve on the basis of the engine output and the input load change amount;
wherein said rotational change condition calculating means comprises an estimated rotational change condition calculating means for calculating an estimated rotational change condition achieved by the transmission ratio varying condition, and said input load change amount calculating means comprises an estimated input load change amount calculating means for calculating an estimated input load change amount by multiplying the estimated rotational change condition indicative value by a predetermined inertia coefficient.

2. A control system comprising:
a continuously variable transmission (CVT) comprising a driver pulley, a follower pulley and a belt intercoupling the pulleys, said CVT varying a transmission ratio by changing effective diameters of the pulleys;
a CVT pressure control valve controlling a pressure of a fluid to be supplied to said CVT;
an engine revolution condition detecting means for detecting a revolution condition of an engine connected to said CVT;
an engine output calculating means for calculating an engine output on the basis of the engine revolution condition;
a rotational change condition calculating means for calculating a rotational change condition of a drive system including the engine and said CVT;
an input load change amount calculating means for calculating a change amount of an input load which is caused by an inertia and applied to said CVT, on the basis of the rotational condition; and
a hydraulic pressure control means for outputting a pressure control signal to said CVT pressure control valve on the basis of the engine output and the input load change amount;
wherein said rotational change condition calculating means comprises an actual rotational change condition detecting means for detecting an actual rotational change condition by directly detecting the rotation condition of the drive system and an estimated rotational change condition calculating means for calculating an estimated rotational change condition achieved from a transmission ratio varying condition, and said input load change amount calculating means comprises an actual input load change amount calculating means for calculating an actual input load change amount caused by the inertia by multiplying the actual rotational change condition indicative value by a predetermined inertia coefficient and an estimated input load change amount calculating means for calculating an estimated input load change amount by multiplying the estimated rotational change condition detection value by the predetermined inertia coefficient.

3. A control system as claimed in claim 2, further comprising a selecting means for selecting a larger one of the actual input load change amount and the estimated input load change amount so as to further increase the input load to the CVT mechanism.

4. A control system for a continuously variable transmission (CVT), the CVT comprising a driver pulley, a follower pulley and a belt intercoupling the pulleys and constituting a drive system with an engine, the control system comprising:

an engine revolution speed sensor detecting an engine revolution speed of an engine connected to the CVT and outputting an engine revolution speed indicative signal;

a line pressure duty valve controlling a hydraulic pressure to be applied to the pulleys of the CVT according to a command signal; and a controller receiving the signal from said engine revolution speed sensor, said controller being arranged to perform computing an engine revolution condition on the basis of the engine revolution speed indicative signal, computing an engine output on the basis of the engine revolution condition, computing a rotational change condition of the drive system, computing a change amount of an input load to the CVT generated by an inertia on the basis of the rotational change condition of the drive system, and outputting the command signal to said line pressure duty valve on the basis of the engine output and the input load change amount;

wherein said controller is further arranged to perform computing an actual rotational change condition by directly detecting the rotation condition of the drive system, computing an estimated rotational change condition achieved from a transmission ratio varying condition, computing an actual input load change amount caused by the inertia by multiplying the actual rotational change condition indicative value by a predetermined inertia coefficient, computing an estimated input load change amount by multiplying the estimated rotational change condition indicative value by a predetermined inertia coefficient, and selecting a larger one of the actual input load change amount and the estimated input load change amount as the input load change amount for outputting the command signal.

5. A control system comprising:

a continuously variable transmission (CVT) comprising a driver pulley, a follower pulley and a belt intercoupling the pulleys, said CVT varying a transmission ratio;

an engine revolution speed sensor detecting a engine revolution speed of an engine connected to the CVT and outputting an engine revolution speed indicative signal;

a line pressure duty valve controlling a hydraulic pressure to be applied to the pulleys of the CVT according to a command signal;

a controller including;
a feedback inertia torque calculating means for calculating a feedback inertia torque,
a feedforward inertia torque calculating means for calculating a feedforward inertia torque,
a selecting means for selecting a larger one of the feedback inertia torque and the feedforward inertia torque as a representative inertia torque, and
a hydraulic pressure control means for producing the command signal according to the engine output and the inertia torque and for outputting the command signal to said line pressure duty valve.

6. A control system as claimed in claim 5, wherein said feedback inertia torque calculating means calculates the feedback inertia torque by multiplying a rate of change of the engine revolution speed with a predetermined coefficient upon calculating the rate of change of the engine revolution speed per time from the engine revolution speed indicative signal, and wherein said feedforward inertia torque calculating means calculates the feedforward inertia torque by multiplying a rate of change of a driver pulley rotation speed with a predetermined coefficient upon calculating the rate of change of the driver pulley rotation speed from the vehicle speed and the transmission ratio.

7. A control system as claimed in claim 6, wherein said feedback inertia torque calculating means calculates the feedback inertia torque $T_{INP}$ from the following equations (1) and (2):

$$dN_E/dt=(N_{E(n)}-N_{E(n-1)})/\Delta T \qquad (1)$$

$$T_{INP}=-(dN_E/dt)\cdot I \qquad (2)$$

where $N_{E(n)}$ is a present value of the engine revolution speed read, $N_{E(n-1)}$ is a previous value of the engine revolution speed, $\Delta T$ is a sampling time period, and I is an inertia moment of the drive system, and wherein said feedforward inertia torque calculating means calculating the feedforward torque $T_{INR}$ from the following equations (3) and (4):

$$dN_{Pri}/dt=(k\cdot V_{SP}\Delta C)/\Delta T \qquad (3)$$

$$T_{INR}=-(dN_{Pri}/dt)\cdot I \qquad (4)$$

where k is a coefficient, VSP is a vehicle speed, $\Delta C$ is a difference between an objective transmission ratio $C_R$ and a present transmission ratio $C_P$ of said CVT, $\Delta T$ is the sampling time period, and I is the inertia moment of the drive system.

* * * * *